May 18, 1943.  A. C. KORTE ET AL  2,319,408

WINDSHIELD WIPER PARKING DEVICE

Filed Nov. 25, 1941

INVENTOR
KENNETH LANNERT
ALFRED C. KORTE
Donald U. Rich
ATTORNEY

Patented May 18, 1943

2,319,408

UNITED STATES PATENT OFFICE 2,319,408

WINDSHIELD WIPER PARKING DEVICE

Alfred C. Korte, St. Louis, and Kenneth Lannert, St. Johns Station, Mo., assignors to Carter Carburetor Corporation, St. Louis, Mo., a corporation of Delaware Application November 25, 1941, Serial No. 420,394

4 Claims. (Cl. 15—255)

This invention relates to motor control means and consists particularly in a novel parking device for use, more particularly, with automobile windshield wiper motors.

A satisfactory windshield wiper control must be of the pre-selecting variety in which, regardless of the time when the control is actuated, the wiper blade or blades will be stopped or "parked" at the ends of their normal strokes so as to be out of the driver's direct line of vision. Where the blades are operated by an electric motor, the control must cut off the supply of electric current to the motor and, preferably, should provide a mechanical stop for the wiper blades to prevent coasting and insure parking of the blades at the proper position.

An object of the invention is to provide a motor control which is applicable with advantage to a motor used for operating a windshield wiper blade and which control fulfills the above mentioned requirements and is, further, of unusual durability and simplicity.

In the accompanying drawing which illustrates the invention;

Figure 1:
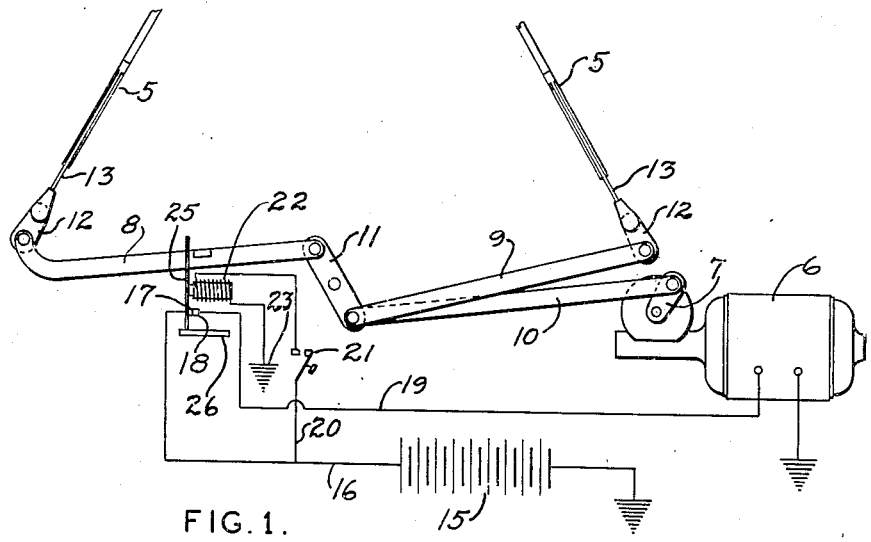
Fig. 1 is a front view showing windshield wiper parts for a truck or automobile, the electrical control mechanism being shown diagrammatically.

The wiping device illustrated is adapted to be mounted on an automobile or truck in the usual position beneath the cowl, but the manner of mounting may be conventional and is not here shown. The blades 5 are operated by an electric motor 6 through the intermediary of a rotating crank 7, suitably geared to the motor, transmission links 8, 9 and 10, and centrally pivoted lever 11. Link 10 is eccentrically pinned at its end to crank 7 and one end of lever 11, and links 8 and 9 are pinned at their ends to the opposite ends of lever 11 and to small arms 12 more or less directly connected to arms 13 carrying blades 5.

The motor is operated by the usual battery 15, one lead each of the battery and motor being grounded, as shown. The other lead 16 from the battery to a movable switch point 17 and the stationary point 18 of the latter switch is connected by lead 19 to the motor. A second lead 20 extends through a manually operated switch 21 to a solenoid coil 22 and thence to ground 23. Movable switch point 17 is carried by a resilient strip 25 anchored in an insulating block 26 which also carries stationary point 18, as shown in detail in Figs. 2 and 3. Strip 25 yieldingly maintains the switch points in contact. The core 27 of solenoid 22 is connected by a link 28 to resilient strip 25 above switch point 17. A projection 24 on one of the transmission links 8 cooperates with actuator 25 as hereafter described.

Figures 2, 3:
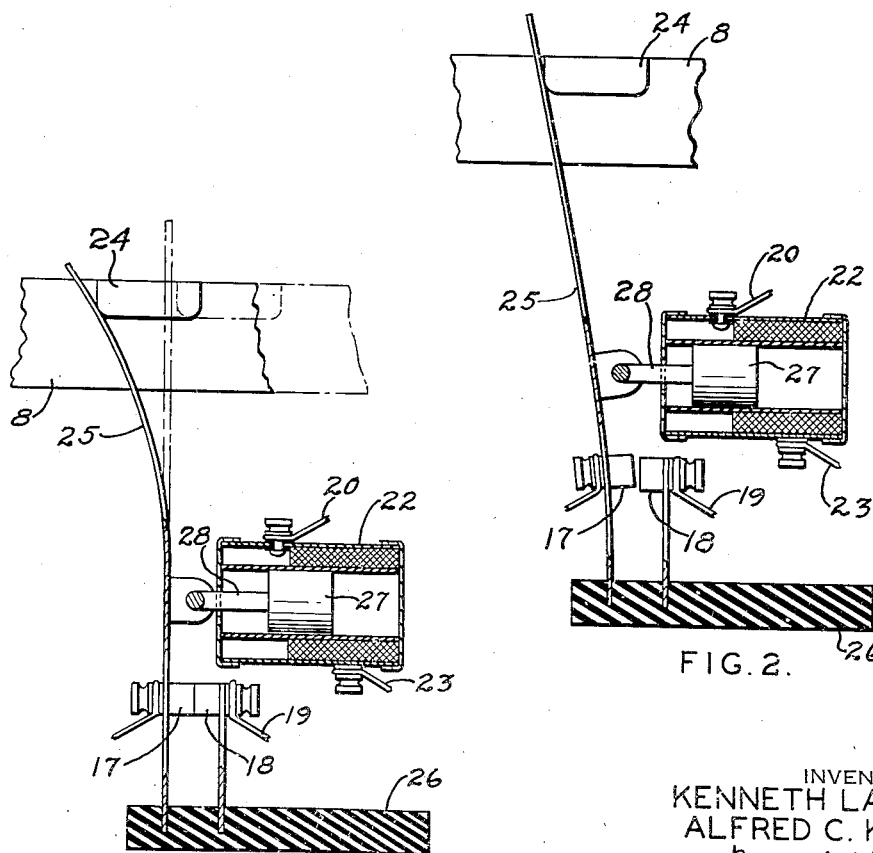
Fig. 2 is a sectional view showing the motor control parts on an enlarged scale and in the "parked" position.
Fig. 3 is a view similar to Fig. 2 but showing the control switch in the "on" or running position.

The wiper control operates as follows:

When "parking" switch 21 is closed, current directed through solenoid 22 will cause core 27 to be drawn inwardly, thus contacting switch points 17 and 18, as in Fig. 3. This is the normal running position of the mechanism. Projection 24 on link 8 engages and diverts resilient strip 25 once during each cycle of operation of the wiper blades, preferably at the outer end thereof. When solenoid 22 is energized, as stated, strip 25 yields when so engaged by projection 24, as shown in Fig. 3, and switch points 17 and 18 are prevented by the solenoid from breaking.

When manual switch 21 is opened and solenoid 22 thereby deenergized, switch points 17 and 18 will be held in contact by the resilience of strip 25 until this strip is engaged by projection 24 whereupon the motor controlling circuit will be broken to stop or "park" the wipers (Fig. 2). When this occurs, resilient strip 25 functions as a mechanical break to limit coasting of the motor and blades beyond their normal parked position.

While the invention is shown applied to an electric wiper device, certain features thereof may be incorporated with advantage in other types of wiper operating mechanisms wherein the power stopping device is prevented from stopping the application of power pending the actuation of a manual control to render the holding means ineffective. The exclusive use of all modifications as come within the scope of the appended claims is contemplated.

We claim:

1. A parking control for electric windshield wipers comprising a motor controlling switch, a resilient actuator therefor normally yieldingly maintaining said switch closed, a member cyclically movable with the wiper and disposed to engage and divert said actuator at a predetermined point in each cycle, an electro-magnet functioning, when energized, to urge and hold said switch in its closed position irrespective of said cyclical member, and a second, manual switch for controlling the application of current to said electro-magnet and thereby stopping and starting the wiper.

2. In a windshield wiper control, an element to control the application of power medium to the wiper, an actuator for said element normally yieldingly maintaining said element in position to operate the wiper, a member cyclically movable with the wiper and adapted to engage and divert said actuator during each cycle, means to prevent movement of said control element from its operative position irrespective of said cyclical member, and a manual device to control said means for selectively rendering the same operative and inoperative to affect said actuator and control element.

3. A parking control for a windshield wiper motor comprising a device for controlling the application of power medium to the motor, a member subject to cyclical movement with the wiper, a resilient actuator for said controlling device having a portion normally maintaining said device in an operative, power applying position and a second portion extending into the normal path of said cyclical member so as to be diverted thereby at a predetermined point in each cycle thereof, and a manually controlled element movable to a position to hold said power controlling device in said operative position and to another position to release said device for movement by said cyclical member, through said actuator, to shut-off position.

4. A parking control for an electric windshield wiper comprising a motor control switch having a movable contact, a member subject to cyclical movement with the wiper, a resilient actuator for said movable contact having a part normally yieldingly maintaining said contact in closed position and having a portion extending into the path of said cyclical member so as to be distorted in switch opening direction at a predetermined point in each cycle of said member, an electro magnet which when energized is capable of moving said movable switch contact to and holding the same in closed position, irrespective of said cyclical member, and a manual parking switch controlling the supply of current to said electro magnet so that when said switch is closed, said control switch will be closed by said magnet to operate the wiper and when said manual switch is opened said control switch will be opened by said cyclical member to park the wiper.

ALFRED C. KORTE.
KENNETH LANNERT.